US008537137B2

(12) United States Patent
Kinugasa

(10) Patent No.: US 8,537,137 B2
(45) Date of Patent: Sep. 17, 2013

(54) INPUT DEVICE AND INFORMATION PROCESSING APPARATUS FOR ENTERING AN ENERGY-SAVING MODE

(75) Inventor: Hiroshi Kinugasa, Hamura (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 313 days.

(21) Appl. No.: 12/558,853

(22) Filed: Sep. 14, 2009

(65) Prior Publication Data
US 2010/0134531 A1   Jun. 3, 2010

(30) Foreign Application Priority Data
Dec. 3, 2008   (JP) .................................. 2008-308606

(51) Int. Cl.
*G06F 3/042* (2006.01)

(52) U.S. Cl.
USPC ......................................................... 345/175

(58) Field of Classification Search
None
See application file for complete search history.

(56) References Cited

U.S. PATENT DOCUMENTS 7,825,912 B2 * 11/2010 Lee ................................ 345/175
2007/0132710 A1   6/2007 Tateuchi et al.

FOREIGN PATENT DOCUMENTS

| JP | 2004-297601 A | 10/2004 |
| JP | 2005-529395 A | 9/2005 |
| JP | 2007-163891 A | 6/2007 |
| JP | 2007-531146 A | 11/2007 |

OTHER PUBLICATIONS

JP Office Action mailed on May 29, 2012 as received in application No. 2008-308606.

* cited by examiner

*Primary Examiner* — Daniell L Negron
(74) *Attorney, Agent, or Firm* — Maschoff Brennan

(57) ABSTRACT

An input device includes light-emitting units, which are arranged around a display, and configured to emit an inspection light, light-receiving units, which are arranged around the display, and configured to receive the inspection light, and a control unit configured to determine whether an input is valid or not based on an intensity of light received by the light-receiving units, and transit to an energy-saving mode when the input is not valid.

9 Claims, 3 Drawing Sheets

INPUT DEVICE AND INFORMATION PROCESSING APPARATUS FOR ENTERING AN ENERGY-SAVING MODE

CROSS-REFERENCE TO RELATED APPLICATIONS

This application is based upon and claims the benefit of priority from prior Japanese Patent Application No. 2008-308606, filed Dec. 3, 2008, the entire contents of which are incorporated herein by reference.

BACKGROUND OF THE INVENTION

1. Field of the Invention

The present invention relates to an input device which detects a three-dimensional position of an object as an input position.

2. Description of the Related Art

A user of an information processing apparatus usually uses an input interface such as a keyboard, a numeric keypad, and a mouse. As a kind of input interface, a pointing device is known as a means to move a pointer on a display. A mouse is a typical pointing device, but its size and weight are unsuitable for a portable information processing apparatus (e.g., a cellphone, personal digital assistant [PDA], or mobile computer). A touch panel is known as a more portable pointing device. In a touch panel, a user can select or operate graphical user interface elements (icon, button, menu, check box, etc.) by touching a finger or other objects such as a stylus in a desired area of a display.

Jpn. Pat. Appln. KOKAI Publication Nos. 2005-529395 and 2007-531146 disclose a three-dimensional input method of detecting a three-dimensional position of an object with reference to a display.

Jpn. Pat. Appln. KOKAI Publication No. 2005-529395 discloses a computer navigation, which estimates a three-dimensional position of an object with reference to a display, based on the area and ellipse eccentricity of conical infrared rays emitted from a distal end of an object to a display.

Jpn. Pat. Appln. KOKAI Publication No. 2007-531146 discloses a control unit, which detects an electromagnetic beam emitted from a distal end of an object to a display by detectors provided at least one side of the display. The electromagnetic beam is attenuated before reaching the detectors from a position colliding against the display. The control unit of Jpn. Pat. Appln. KOKAI Publication No. 2007-531146 estimates the distance and angle (three-dimensional position) of the object with reference to the display, based on the intensity of electromagnetic beam detected by the detectors.

According to the computer navigation of Jpn. Pat. Appln. KOKAI Publication No. 2005-529395 and the control unit of Jpn. Pat. Appln. KOKAI Publication No. 2007-531146, even when an object does not touch a display, a three-dimensional position of the object can be detected with reference to the display.

There is another known three-dimensional input device, which is provided with light-emitting units such as infrared light-emitting diodes (LED) and light-receiving units such as photodiodes, around a display. Specifically, there are two known methods of detecting a three-dimensional position. One method (reflection method) detects a three-dimensional position based on changes in the intensity of received light caused by that an object reflects light emitted from a light-emitting unit (hereinafter, simply called an inspection light). The other method (transmission method) detects a three-dimensional position based on changes in the intensity of received light caused by that an object blocks light emitted from a light-emitting unit.

Jpn. Pat. Appln. KOKAI Publication No. 2004-297601 discloses a method of saving electrical energy in a mobile terminal. A mobile terminal disclosed in the Jpn. Pat. Appln. KOKAI Publication No. 2004-297601 consists of a first unit provided with an input device such as a key panel having a lighting function, and a second unit to expose and cover the input device by sliding over the first unit. In the above mobile terminal, the input device is lit while being exposed by the second unit, and not lit while being covered by the second unit. Therefore, according to the Jpn. Pat. Appln. KOKAI Publication No. 2004-297601, a so-called slide-type mobile terminal efficiently turns on an input device, and reduces energy consumption.

In the above reflection- and transmission-type three-dimensional input devices, the light-emitting unit and light-receiving unit must be closely arranged, and operated to provide high detection accuracy. In other words, greater electrical power is required to obtain higher detection accuracy. If the light-emitting and light-receiving units are operated while a valid input is not obtained, electrical energy is wasted. Especially, in a battery-operated portable information processing apparatus, the energy consumption of an input unit reduces the operable time of the apparatus. The three-dimensional input device is not necessarily used in a slide-type mobile terminal, and the energy-saving method of the Jpn. Pat. Appln. KOKAI Publication No. 2004-297601 is not necessarily used.

BRIEF SUMMARY OF THE INVENTION

According to an aspect of the invention, there is provided an input device provided in an information processing apparatus having a display, comprising: light-emitting units, which are arranged around the display, and configured to emit an inspection light; light-receiving units, which are arranged around the display, and configured to receive the inspection light; and a control unit configured to determine whether an input is valid or not based on an intensity of light received by the light-receiving units, and transit to an energy-saving mode when the input is not valid.

According to another aspect of the invention, there is provided an information processing apparatus comprising: a display; and an input device which includes: light-emitting units, which are arranged around the display, and configured to emit an inspection light; light-receiving units, which are arranged around the display, and configured to receive the inspection light; and a control unit configured to determine whether an input is valid or not based on an intensity of light received by the light-receiving units, and transit to an energy-saving mode when the input is not valid.

DETAILED DESCRIPTION OF THE INVENTION

Embodiments of the present invention will be explained hereinafter with reference to the accompanying drawings.

(Embodiment 1)

Figure 1:
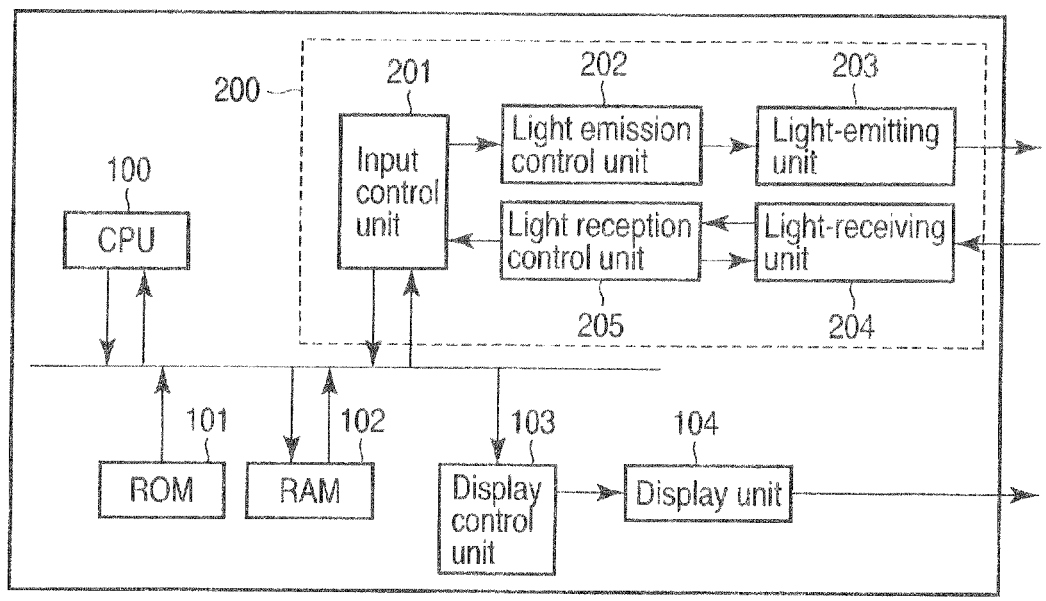
FIG. 1 is a block diagram showing an input device according to a first embodiment.

As shown in FIG. 1, an information processing apparatus, such as a cellphone and data terminal, provided with an input device 200 according to a first embodiment has a central processing unit (CPU) 100, a read-only memory (ROM) 101, a random access memory (RAM) 102, a display control unit 103, and a display unit 104.

The CPU 100 generally controls units of the information processing apparatus of FIG. 1. For example, the CPU 100 exchanges data with units of the information processing apparatus of FIG. 1, and performs predetermined operations by using the exchanged data.

The ROM 101 records a control program to be executed by the CPU 100, and data to be displayed on the display unit 104. The RAM 102 saves control data to be read or written during execution of the control program by the CPU 100.

The display unit 104 consists of such as a liquid crystal display (LCD) or an organic light-emitting diode (OLED) display, for example, and light-emitting units 203 and light-receiving units 204 provided around the display unit as described later. The display control unit 103 controls the display unit 104 to display contents instructed by the CPU 100.

The input device 200 is a so-called three-dimensional input device, which detects a three-dimensional position of an object 300 (e.g., a user's finger) as an input position with reference to the display unit 104. The input device 200 has an input control unit 201, a light emission control unit 202, light-emitting units 203, light-receiving units 204, and a light reception control unit 205.

The input control unit 201 controls the light emission control unit 202 and light reception control unit 205. For example, the input control unit 201 detects a three-dimensional position of the object 300 as an input position with reference to the display unit 104, based on the intensity of light received from the light reception control unit 205. The input control unit 201 determines whether the intensity of received light satisfies a transition condition described later in an input detection process.

The light emission control unit 202 controls the light-emitting units 203. For example, the light emission control unit 202 controls on/off of the light-emitting units 203 according to the instruction from the input control unit 201. The on/off control of the light-emitting unit 203 is realized by controlling the supply of driving power to the light-emitting unit 203.

The light-emitting units 203 consist of infrared LEDs, for example, and are arranged around the display unit 104. The light-emitting units 203 emit an inspection light according to the instruction from the light emission control unit 202. The inspection light emitted from the light-emitting units 203 is diffracted, blocked or reflected by the object 300. The light-receiving units 204 consist of photodiodes, for example, and are arranged around the display unit 104. The light-receiving units 204 inform the light reception control unit 205 of the intensity or received light.

The light emission control unit 205 controls the light-receiving units 204. For example, the light emission control unit 205 inputs the intensity of received light informed from the light-receiving units 204 to the input control unit 201. The light emission control unit 205 turns on and off the light-receiving units 204 according to the instruction from the input control unit 201. When the light-receiving units 204 are driven electrically, the on/off control of the light-receiving units 204 is realized by controlling the driving power to the light-emitting units 203. The light emission control unit 205 may simply disregard the intensity of received light informed from a turned-off light-emitting part 204. By disregarding the informed intensity of received light, the amount of operation required to detect an input position can be decreased.

Figure 2:
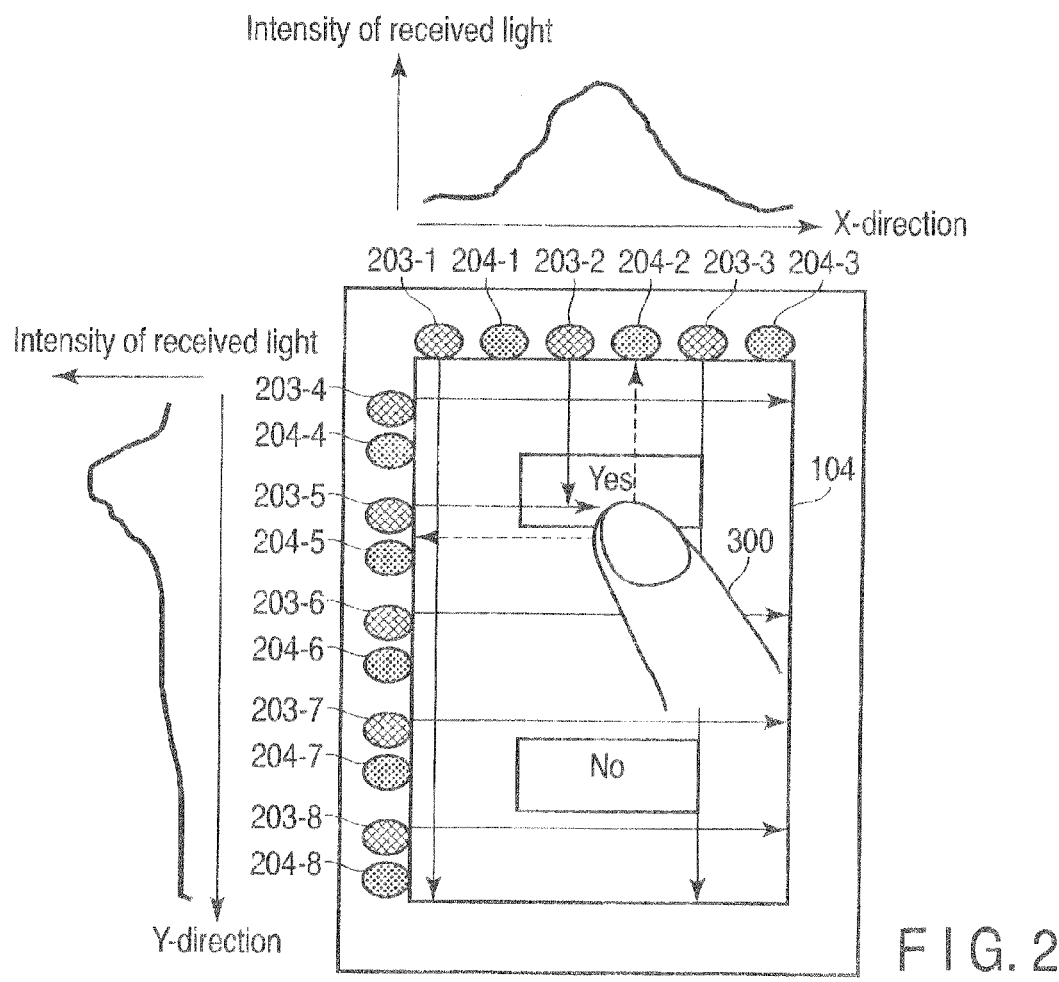
FIG. 2 is a diagram explaining the principle of detection of a three-dimension position in the input device of FIG. 1.

Hereinafter, an explanation will be given of an example of the principle of detecting a three-dimensional position by the input device 200 with reference to FIG. 2. In FIG. 2, a three-dimensional position is detected by a so-called reflection method.

In FIG. 2, the light-emitting units 203 and light-receiving units 204 are arranged on one side (upper side) and another side (left side) of the display unit 104. Specifically, three light-emitting units 203-1, 203-2 and 203-3 are arranged on the upper side, and three light-receiving units 204-1, 204-2 and 204-3 are arranged close to the light-emitting units. Five light-emitting units 203-4, 203-5, 203-6, 203-7 and 203-8 are arranged on the left side, and five light-receiving units 204-4, 204-5, 204-6, 204-7 and 204-8 are arranged close to the light-emitting units.

To detect an input position, the input control unit 201 supplies driving power to eight light-emitting units 203-1 to 203-8 through the light emission control unit 202. Receiving the driving power, light-emitting units 203-1 to 203-8 emit an inspection light. A part of the inspection light (indicated by the solid line arrow in FIG. 2) emitted from light-emitting units 203-1 to 203-8 is reflected by the object 300, and the reflected light (indicated by the broken line arrow in FIG. 2) is received by light-receiving units 204-1 to 204-8.

As the inspection light is attenuated before reaching the object 300, the inspection light emitted from the light-emitting units 203 closer to the object 300 tends to be reflected with higher intensity. As the reflected light is also attenuated before reaching the light-receiving units 204, the light-receiving units 204 closer to the object 300 tend to receive light with higher intensity. In other words, the intensity of received light varies in the light-receiving units 204.

In the example of FIG. 2, the coordinates of an object in the horizontal direction (X-axis direction) can be detected based on the intensity of received light in light-receiving units 204-1 to 204-3, and the coordinates of an object in the vertical direction (Y-axis direction) can be detected based on the intensity of light received in light-receiving units 204-4 to 204-8. For example, when detecting the Y-coordinate of the object 300, as shown in FIG. 2, the intensity of light received in light-receiving units 204-5 to 204-8 are plotted as the intensity of received light corresponding to the Y-coordinate along which they are arranged. Polynomial interpolation is performed for the plotted intensity of received light, and an asymptotic line is obtained. A Y-coordinate corresponding to the top (maximum value) of the asymptotic line can be detected as a Y-coordinate of the object 300. When detecting an X-coordinate of the object 300, the same operation is performed for the intensity of received light in light-receiving units 204-1 to 204-3.

The coordinates of the height direction (Z-axis direction) of the object 300 can be detected based on the intensity of received light in the X-coordinate and/or Y-coordinate. Actually, the accuracy of detecting the height is lower than the accuracy of detecting a position on a plane, and the height is expressed stepwise, not by concrete coordinates, in many cases. For example, when dividing the Z-coordinate of the object 300 into three steps of touch, approach (hover) and non-detection, the object can be determined by comparing two large and small threshold values th1, th2 (th1>th2). In other words, when the intensity of received light is higher than the threshold value th1, it is determined to be a touch. When the intensity of received light is lower than the threshold value th2, it is determined to be a non-detection. When the intensity of received light is between the threshold values th2 and th1, it is determined to be a hover.

Next, an energy-saving method in the input device 200 will be considered. As described above, many light-emitting units 203 and light-receiving units 204 must be operated to detect an input position with a high accuracy, and wasting of electrical energy in a period while a valid input is not obtained is not disregarded.

As one energy-saving method, if the input control unit 201 does not detect an input for longer than a predetermined time (if the Z-axis is determined to be a non-detection state), the input unit 200 can be operated by saving energy by turning off at least some of the light-emitting units 203 and light-receiving parts 204. However, this energy-saving method has a problem that the validity of input is not considered.

The input control unit 201 detects an input position according to a maximum value of the received light intensity. This has the possibility of detecting an irregular input through an obstacle 400, as well as detecting a normal input through an object 300 such as a user's finger or a stylus. For example, the input control unit 201 can detect an input, even if something is put on the display unit 104, the display unit 104 is put on a table with the upside down, or the information processing apparatus is put in a user's pocket, bag or case, and a valid input cannot be obtained. In other words, when the input control unit 201 detects a kind of input, the input may be an invalid input unintended by the user. Therefore, it is insufficient to determine a energy-saving operation only by that the input control unit 201 does not detect an input continuously for longer than a predetermined time, and it is desirable to consider the validity of input.

Figure 3:
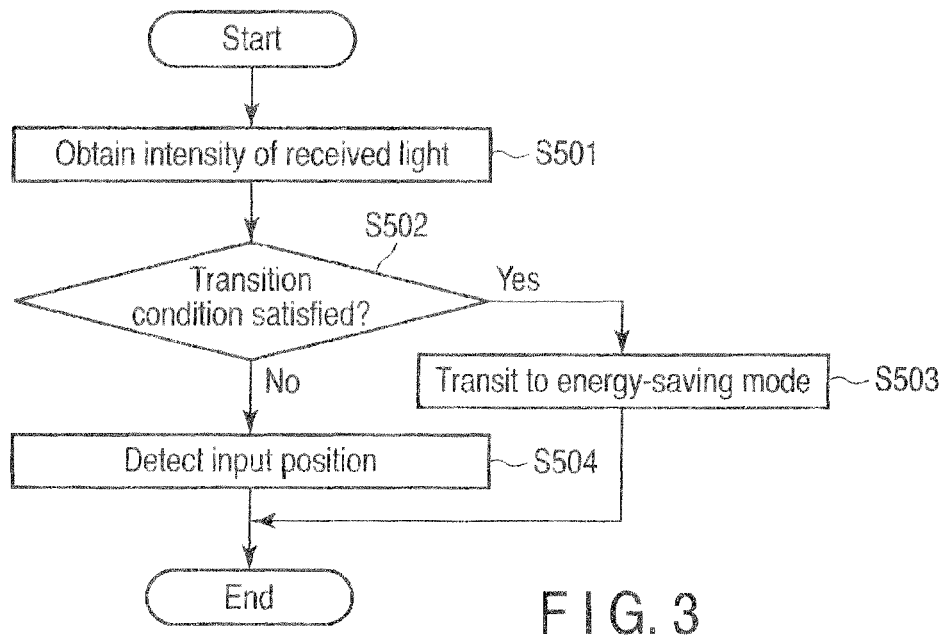
FIG. 3 is a flowchart of an input detection process in the input device of FIG. 1.

Therefore, the input control unit 201 detects an input according to the flowchart shown in FIG. 3.

First, the input control unit 201 obtains the intensity of received light from the light reception control unit 205 (step S501). Then, the input control unit 201 determines whether the intensity of received light obtained in step S501 satisfies a transition condition described later (step S502). If the intensity of received light satisfies the transition condition, the process goes to step S503, and to step S504 if not. In step S504, the input control unit 201 detects an input, and the process is terminated.

In step S503, the input control unit 201 sets the input device 200 to an energy-saving mode, and the process is terminated. For example, during transition to the energy-saving mode, the input control unit 201 turns off at least some of the light-emitting units 203 and light-receiving units 204 through the light emission control unit 202 and light reception control unit 205. When the input device is transited to the energy-saving mode, the display control unit 103 may turn off the display unit 104, or darken the backlight.

Figure 4:
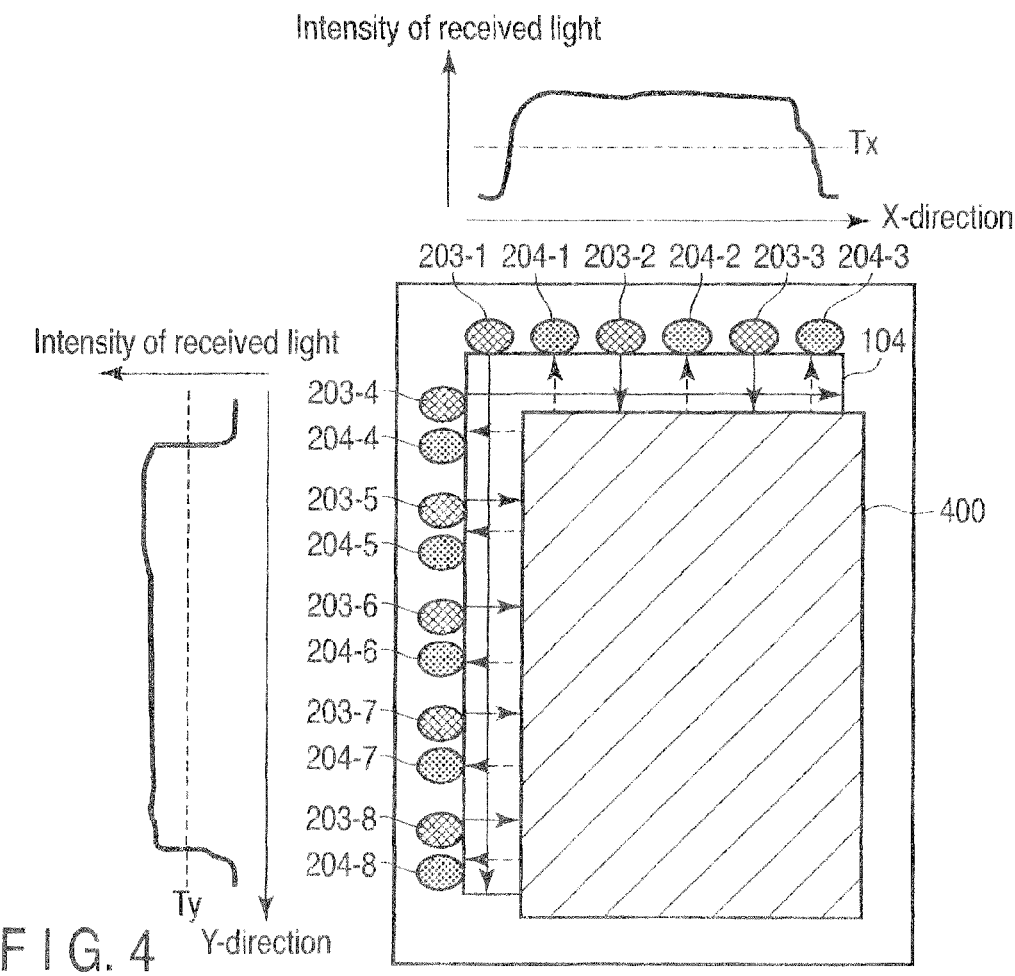
FIG. 4 is a diagram explaining the transition condition in FIG. 3.

Next, a transition condition is explained. A transition condition is used to determine whether an input is valid based on the intensity of received light. When the intensity of received light satisfies a transition condition, the input may not be valid with a high possibility. Here, as an invalid input, an input through the obstacle 400 is assumed as shown in FIG. 4. The obstacle 400 covers at least a part of the area of the display unit 104, and reflects an inspection light. Therefore, as shown in FIG. 4, a relatively large number of light-receiving units 204 shows a high intensity of received light for the input through the obstacle 400. On the other hand, the object 300 approximately covers one point of the display unit 104, and reflects an inspection light. Therefore, as shown in FIG. 2, a relatively small number of light-receiving units 204 shows a high intensity of received light for the input through the object 300. In other words, the number of light-receiving units 204 providing the high intensity of received light is significantly different for a valid input through the object 300 and an invalid input through the obstacle 400.

Therefore, the input device according to this embodiment defines a transition condition by using an index indicating the rate of the light-receiving units 204 providing the high intensity of received light, as shown in the following equations (1 and 2).

$$Ax = \left(\sum_{s=1}^{Nx} F(Ixs > Tx)\right) \cdot \frac{100}{Nx} \quad (1)$$

In Equation 1, Ax indicates the rate (percentage) of the light-receiving units 204, which are arranged along the X-axis direction, and provide the high intensity of received light, Nx indicates the number of light-receiving units 204 arranged along the X-axis direction, s indicates a variable for a counter, Ixs indicates the intensity of light received in the sth light-receiving unit 204 in the X-axis direction, and Ts indicates a threshold value. In Equation 1, F (Ixs>Tx) is a function which returns 1 if Ixs>Tx is true, and 0 if not (Ixs≦Tx).

$$Ay = \left(\sum_{s=1}^{Ny} F(Iys > Ty)\right) \cdot \frac{100}{Ny} \quad (2)$$

In Equation 2, Ay indicates the rate (percentage) of the light-receiving units 204, which are arranged along the Y-axis direction, and provide the high intensity of received light, Ny indicates the number of light-receiving units 204 arranged along the Y-axis direction, s indicates a variable for a counter, Iys indicates the intensity of light received in the sth light-receiving unit 204 in the Y-axis direction, and Ty indicates a threshold value. In Equation 2, F (Iys>Ty) is a function which returns 1 if Iys>Ty is true, and 0 if not (Iys<Ty).

The above threshold values Tx and Ty may be or may not be the same value as the above threshold value th1 or th2. For example, the threshold values Tx and Ty may be designed or experimentally derived to have a significant difference in Ax and Ay for the inputs through the object 300 and obstacle 400. The threshold values Tx and Ty may be the same value, or may be different values.

As described above, while the rate of the light-receiving units 204 providing the high intensity of received light for the input through the object 300 is decreased, the rate of the light-receiving units 204, which provide the high intensity of received light for the input through the obstacle 400, is increased. Therefore, by using the above index, whether the input is valid or not can be determined. For example, at least one of the following conditions (a to d) may be defined as a transition condition.

(a) Ax is larger than the threshold value At1.
(b) Ay is larger than the threshold value At2.
(c) Ax is larger than the threshold value At3, and Ay is larger than the threshold value At4.

(d) A product of Ax and Ay is larger than the threshold value At5.

The above threshold values At1 to At5 may be optionally defined in consideration of the size of the assumed obstacle 400, and the state that the obstacle 400 covers the display unit 104. The above conditions (a to d) may be combined to define a transition condition.

As explained above, the input device according to this embodiment determines whether an input is valid based on the intensity of received light, and transits to an energy-saving mode if the input is invalid. Therefore, the input device according to this embodiment can be operated from saved energy in a period while a valid input is not obtained.

Further, an information processing apparatus provided with the input device according to this embodiment is automatically transited to an energy-saving mode when it is put on a table with a display upside turned down, or put in a user's pocket, bag or case. Therefore, the information processing apparatus can be operated for a long time even if a user does not intentionally set an energy-saving mode.

(Embodiment 2)

Comparing with the input device according to the first embodiment, a position detection method is different in an input device according to a second embodiment of the invention. Specifically, an input device 200 according to a second embodiment detects a position by a so-called transmission method.

Hereinafter, an explanation will be given of an example of the principle of detecting a three-dimensional position by the input device 200 with reference to FIG. 5.

Figure 5:
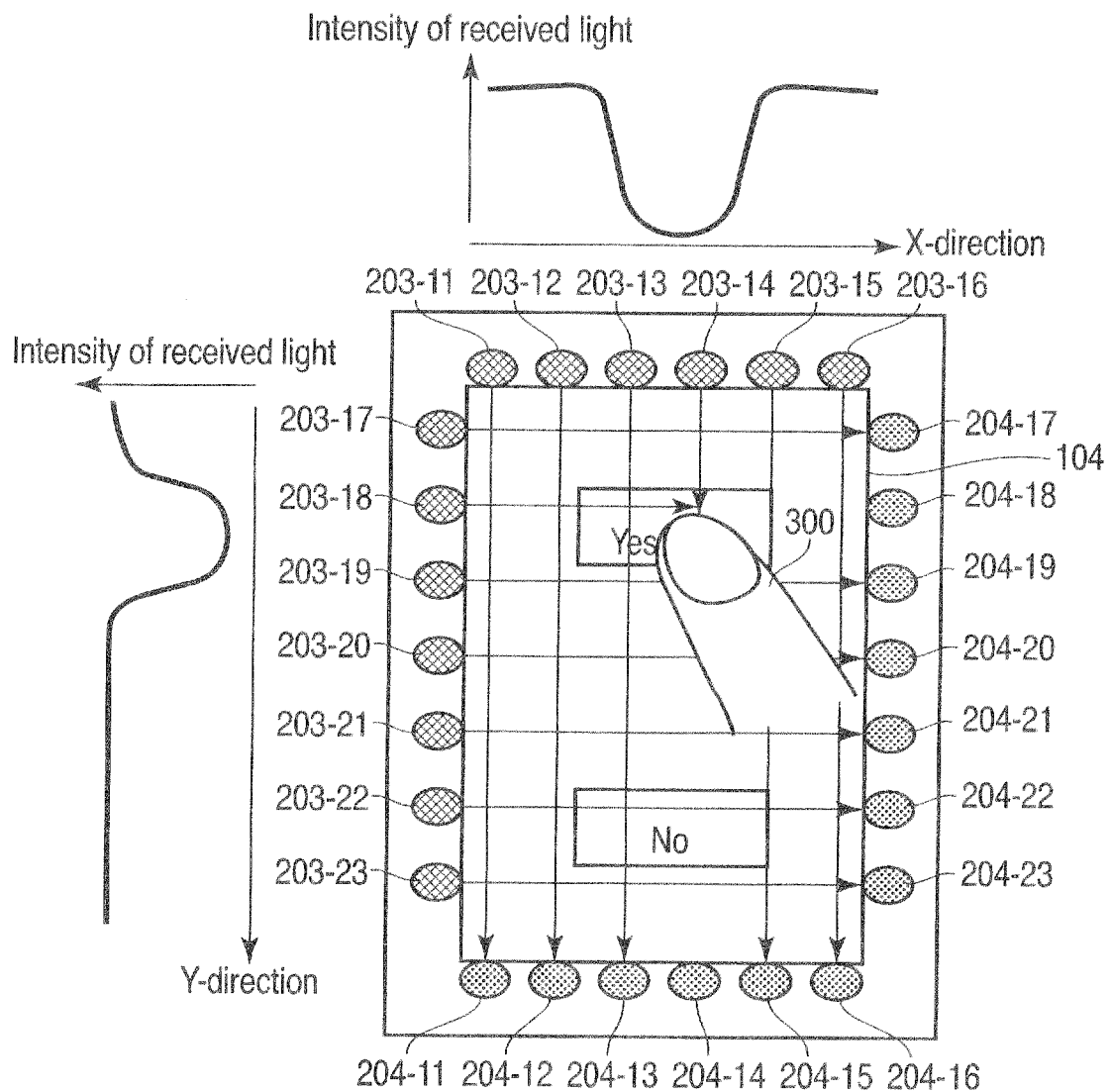
FIG. 5 is a diagram explaining the principle of detection of a three-dimensional position in an input device according to a second embodiment.

In FIG. 5, light-emitting units 203 and light-receiving units 204 are arranged on one side (upper side) of a display 104, another side (lower side) opposite to the upper side, a still another side (left side) perpendicular to the upper and lower sides, and the other side (right side) opposite to the left side. Specifically, six light-emitting units 203-11 to 203-16 are arranged on the upper side, and six light-receiving units 204-11 to 204-16 are arranged on the lower side. Seven light-emitting units 203-17 to 203-23 are arranged on the left side, and seven light-receiving units 204-17 to 204-23 are arranged on the right side.

To detect an input position, the input control unit 201 supplies driving power to the above thirteen light-emitting units 203-11 to 203-23 through the light emission control unit 202. Receiving the driving power, light-emitting units 203-11 to 203-23 emit an inspection light. A part of the inspection light (indicated by the solid line arrow in FIG. 5) emitted from light-emitting units 203-11 to 203-23 is blocked by the object 300, and the residual inspection light is received by light-receiving units 204-11 to 204-23.

As an inspection light is blocked by the object 300, the light-receiving units 204 closer to the object 300 tend to have a lower intensity of received light. In other words, the intensity of received light varies in the light-receiving units 204.

In the example of FIG. 5, the coordinates of an object in the horizontal direction (X-axis direction) can be detected based on the intensity of light received in light-receiving units 204-11 to 204-16, and the coordinates of an object in the vertical direction (Y-axis direction) can be detected based on the intensity of light received in light-receiving units 204-17 to 204-23. For example, when detecting the Y-coordinate of the object 300, as shown in FIG. 5, the intensity of light received in light-receiving unit 204-17 to 204-23 are plotted as the intensity of received light corresponding to the Y-coordinate, along which they are arranged. Polynomial interpolation is performed for the plotted intensity of received light, and an asymptotic line is obtained. A Y-coordinate corresponding to the bottom (minimum value) of the asymptotic line can be detected as a Y-coordinate of the object 300. When detecting an X-coordinate of the object 300, the same operation is performed for the intensity of light received in light-receiving units 204-11 to 204-16.

The coordinates of the height direction (Z-axis direction) of the object 300 can be detected based on the intensity of received light in the X-coordinate and/or Y-coordinate. Actually, the accuracy of detecting the height is lower than the accuracy of detecting a position on a plane, and the height is expressed stepwise, not by concrete coordinates, in many cases. For example, when dividing the Z-coordinate of the object 300 into three steps of touch, approach (hover) and non-detection, the object can be determined by comparing two large and small threshold values th1' and th2' (th1'<th2'). In other words, when the intensity of received light is lower than the threshold value th1', it is determined to be a touch. When the intensity of received light is higher than the threshold value th2', it is determined to be a non-detection. When the intensity of received light is between the threshold values th2' and th1', it is determined to be a hover.

The input device according to the second embodiment is different from the input device according to first embodiment in the principle of position detection, and they are different also in a transition condition to be adopted. Specifically, the rate of the light-receiving units 204, which provide low intensity of received light for an input through the object 300, is decreased, and the rate of the light-receiving units 204, which can obtain low intensity of received light for an input through the obstacle 400, is increased. In other words, the number of light-receiving units 204 to provide low intensity of received light is significantly different for a valid input through the object 300, and an invalid input through the obstacle 400. Therefore, a transition condition may be defined by using the index derived based on the equation obtained by reversing the inequality sign in the aforementioned equations (1 and 2).

As explained herein, the input device according to the second embodiment is different from the input device according to the first embodiment in respect of the input position detection principle, but provides the same effects by defining an appropriate transition condition.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An input device provided in an information processing apparatus having a display, comprising:
light-emitting units, which are arranged around the display, and configured to emit an inspection light;
light-receiving units, which are arranged around the display, and configured to receive the inspection light; and
a control unit configured to determine whether an input is valid or not based on an intensity of light received by the light-receiving units, and transit to an energy-saving mode when the input is not valid;
wherein the control unit determines whether the input is valid based on whether a rate of a number of the light-receiving units among a total number of the light-receiving units which are arranged in a horizontal direction and receive received light having intensity higher than a first threshold value exceeds a second threshold value, wherein the light-receiving units are arranged in horizontal and vertical directions on sides of the display, and the control unit determines whether the input is valid or not based on whether a product of a rate of the number of the light-receiving units among the total number of the light-receiving units, which are arranged in the horizontal direction and receive light having intensity higher than a first threshold value, and a rate of the light-receiving units among the total number of the light-receiving units, which are arranged in the vertical direction receive light having intensity higher than a second threshold value, exceeds a third threshold value.

2. The device according to claim 1, wherein the light-receiving units are arranged in the horizontal direction on one side of the display, and in a vertical direction on another side of the display.

3. The device according to claim 1, wherein the control unit turns off at least some of the light receiving units in the energy-saving mode.

4. The device according to claim 1, wherein the control unit turns off the display in the energy-saving mode.

5. The device according to claim 1, wherein the control unit darkens the backlight of the display in the energy-saving mode.

6. The device according to claim 1, wherein the control unit detects a three-dimensional position of an object as an input position with reference to the display when the input is valid, based on the intensity of the received light.

7. An information processing apparatus comprising:
a display; and
an input device which includes:
light-emitting units, which are arranged around the display, and configured to emit an inspection light;
light-receiving units, which are arranged around the display, and configured to receive the inspection light; and
a control unit configured to determine whether an input is valid or not based on an intensity of light received by the light-receiving units, and transit to an energy-saving mode when the input is not valid,
wherein the control unit determines whether the input is valid based on whether a rate of a number of the light-receiving units among a total number of the light-receiving units which are arranged in a horizontal direction and receive received light having intensity higher than a first threshold value exceeds a second threshold value,
wherein the light-receiving units are arranged in horizontal and vertical directions on sides of the display, and
the control unit determines whether the input is valid or not based on whether a product of a rate of the number of the light-receiving units among the total number of the light-receiving units, which are arranged in the horizontal direction and receive light having intensity higher than a first threshold value, and a rate of the light-receiving units among the total number of the light-receiving units, which are arranged in the vertical direction receive light having intensity higher than a second threshold value, exceeds a third threshold value.

8. An information processing apparatus comprising:
a display; and
an input device which includes:
light-emitting units, which are arranged around the display, and configured to emit an inspection light;
light-receiving units, which are arranged around the display, and configured to receive the inspection light; and
a control unit configured to determine whether an input is valid or not based on an intensity of light received by the light-receiving units, and transit to an energy-saving mode when the input is not valid,
wherein the control unit determines whether the input is valid based on whether a rate of a number of the light-receiving units among a total number of the light-receiving units which are arranged in a horizontal direction and receive received light having intensity higher than a first threshold value exceeds a second threshold value,
wherein the light-receiving units are arranged in horizontal and vertical directions on sides of the display, and
the control unit determines whether the input is valid or not based on whether a product of a rate of the number of light-receiving units, which are arranged in the horizontal direction, and receive light having intensity lower than a first threshold value, and a rate of the number of light-receiving units, which are arranged in the vertical direction, and receive light having intensity lower than a second threshold value, exceeds a third threshold value.

9. An input device provided in an information processing apparatus having a display, comprising:
light-emitting units, which are arranged around the display, and configured to emit an inspection light;
light-receiving units, which are arranged around the display, and configured to receive the inspection light; and
a control unit configured to determine whether an input is valid or not based on an intensity of light received by the light-receiving units, and transit to an energy-saving mode when the input is not valid;
wherein the control unit determines whether the input is valid based on whether a rate of a number of the light-receiving units among a total number of the light-receiving units which are arranged in a horizontal direction and receive received light having intensity higher than a first threshold value exceeds a second threshold value,
wherein the light-receiving units are arranged in horizontal and vertical directions on sides of the display, and
the control unit determines whether the input is valid or not based on whether a product of a rate of the number of light-receiving units, which are arranged in the horizontal direction, and receive light having intensity lower than a first threshold value, and a rate of the number of light-receiving units, which are arranged in the vertical direction, and receive light having intensity lower than a second threshold value, exceeds a third threshold value.

* * * * *